(12) United States Patent
Fenelon et al.

(10) Patent No.: US 9,684,610 B2
(45) Date of Patent: *Jun. 20, 2017

(54) PLATFORM NEUTRAL DEVICE PROTOCOLS

(71) Applicant: Microsoft Technology Licensing, LLC, Redmond, WA (US)

(72) Inventors: Michael P. Fenelon, Bothell, WA (US); Frank Gorgenyi, Bremerton, WA (US); Justin A. Hutchings, Issaquah, WA (US); Guillermo Eduardo Guillen, Redmond, WA (US); Herman Richard Forrest, III, Redmond, WA (US); J. Adrian Lannin, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,519

(22) Filed: Jul. 6, 2016

(65) Prior Publication Data

US 2017/0004096 A1   Jan. 5, 2017

Related U.S. Application Data

(63) Continuation of application No. 13/530,949, filed on Jun. 22, 2012, now Pat. No. 9,411,761.

(51) Int. Cl.
*G06F 3/00* (2006.01)
*G06F 13/10* (2006.01)
(Continued)

(52) U.S. Cl.
CPC ........ *G06F 13/102* (2013.01); *G06F 9/44505* (2013.01); *G06F 9/54* (2013.01); *G06F 13/385* (2013.01); *G06F 13/4286* (2013.01)

(58) Field of Classification Search
None
See application file for complete search history.

(56) References Cited

U.S. PATENT DOCUMENTS 6,023,714 A    2/2000  Hill et al.
6,202,147 B1   3/2001  Slaughter et al.
(Continued)

OTHER PUBLICATIONS

"Corrected Notice of Allowance", U.S. Appl. No. 13/830,949, Apr. 13, 2016, 4 pages.
(Continued)

*Primary Examiner* — Cheng-Yuan Tseng

(57) ABSTRACT

Platform neutral device protocol techniques are described in which functionality to customize device interactions through communication busses is made accessible through platform independent script-based infrastructure. Functionality provided by an operating system to manipulate standard protocols of a communication bus used to interact with a connected device is exposed as script-based objects. Script-based protocol definition files associated with connected device may be employed to customize device protocols for the communications using the functionality exposed through the script-based objects. A computing device may acquire a protocol definition file for a particular device in various ways and host the protocol definition file via a suitable run-time platform. Requests for interaction with the particular device may then be handled using the custom protocols defined by the hosted protocol definition file.

20 Claims, 6 Drawing Sheets

(51) Int. Cl.
*G06F 13/38* (2006.01)
*G06F 9/445* (2006.01)
*G06F 9/54* (2006.01)
*G06F 13/42* (2006.01)

(56) References Cited

U.S. PATENT DOCUMENTS

| | | | |
|---|---|---|---|
| 6,668,376 B1 * | 12/2003 | Wang | G06F 9/4415 710/8 |
| 6,795,872 B2 * | 9/2004 | Page | G06F 8/60 710/104 |
| 7,010,781 B1 | 3/2006 | Brown et al. | |
| 7,072,056 B1 | 7/2006 | Greaves et al. | |
| 9,411,761 B2 | 8/2016 | Fenelon et al. | |
| 2002/0170039 A1 | 11/2002 | Kovacevic | |
| 2004/0122996 A1 | 6/2004 | Carau, Sr. et al. | |
| 2006/0123345 A1 | 6/2006 | Parimi | |
| 2008/0270535 A1 | 10/2008 | Adema et al. | |
| 2009/0054069 A1 | 2/2009 | Calnan, III et al. | |
| 2009/0150909 A1 | 6/2009 | Barreto et al. | |
| 2010/0017461 A1 | 1/2010 | Kokkevis et al. | |
| 2013/0072260 A1 | 3/2013 | Nair et al. | |
| 2013/0346654 A1 | 12/2013 | Fenelon et al. | |

OTHER PUBLICATIONS

"Non-Final Office Action", U.S. Appl. No. 13/530,949, Nov. 5, 2014, 10 pages.

"Notice Of Allowance", U.S. Appl. No. 13/530,949, Apr. 4, 2016, 7 pages.

Bishop, "Cross-Platform Development: Software that Lasts Resources", Published by the IEEE Computer Society, retrieved from <http://ieeexplore.ieee.org/stamp/stamp.jsp?tp=&arnumber=1707631>on Feb. 21, 2012, Oct. 2006, 10 pages.

Forrest, "Bidi Extension for Connected Devices", U.S. Appl. No. 13/228,292, Sep. 8, 2011, 40 pages.

Stottner,"A Platform-Independent User Interface Description Language", Johannes Kepler University Linz, Report 16, retrieved from <http://www.ssw.jku.at/Research/Reports/Report16/Report16. PDF> on Feb. 21, 2012, May 2001, 38 pages.

* cited by examiner

PLATFORM NEUTRAL DEVICE PROTOCOLS

RELATED APPLICATIONS

This application is a continuation of U.S. patent application Ser. No. 13/530,949, filed Jun. 22, 2012, entitled "Platform Neutral Device Protocols", the entire disclosure of which is hereby incorporated by reference herein in its entirety.

BACKGROUND

Various kinds of communication busses (e.g., read/write busses) may be employed to connect devices such as printers, media devices, and cameras to a computing device. Today, such devices make use of compiled drivers that are configured to use standard communication protocols supported by the communication busses. To customize these standard protocols, original equipment manufacturers (OEMs) and independent hardware vendors (IHVs) are forced to maintain detailed knowledge of the custom implementations and develop/construct different devices drivers to match different platforms and processor architectures they will support. Such platform-specific software is traditionally developed using complex binary coding. This makes supporting a wide variety of platforms/architectures difficult and expensive. Due in part to these barriers, OEMs/IHVs may be unwilling to provide ongoing support for older devices as new systems and platform are developed, which may prevent operation and/or access to advanced functionality of such devices on some platforms.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Platform neutral device protocol techniques are described in which functionality to customize device interactions through communication busses is made accessible through platform independent script-based infrastructure. Functionality provided by an operating system to manipulate standard protocols of a communication bus used to interact with a connected device is exposed as script-based objects. Script-based protocol definition files associated with a connected device may be employed to customize device protocols for the communications using the functionality exposed through the script-based objects. A computing device may acquire a script-based protocol definition file corresponding to a particular device in various ways and host the protocol definition file via a suitable run-time platform. Requests for interaction with the particular device may then be handled using the custom protocols defined by the hosted protocol definition file.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

To customize standard communication protocols supported by a communicating bus, original equipment manufacturers (OEMs) and independent hardware vendors are forced to maintain knowledge of the standard communication protocols and develop/construct different devices drivers to match different platforms and processor architectures they will support. This makes supporting a wide variety of platforms/architectures difficult and expensive.

Platform neutral device protocol techniques are described in which functionality to customize device interactions through communication busses is made accessible through platform-independent, script-based infrastructure. Functionality provided by an operating system to manipulate standard protocols of a communication bus used to interact with a connected device is exposed as script-based objects. Script-based protocol definition files associated with a connected device may be employed to customize device protocols for the communications using the functionality exposed through the script-based objects. A computing device may acquire a protocol definition file corresponding to a particular device in various ways and host the protocol definition file via a suitable run-time platform. Requests for interaction with the particular device may then be handled using the custom protocols defined by the hosted protocol definition file.

In the discussion that follows, a section titled "Operating Environment" is provided and describes an example environment in which one or more embodiments can be employed. Next, a section titled "Example Platform Neutral Device Protocol Techniques" describes example details and procedures for implementing custom device protocols through script-based protocol definition files in accordance with one or more embodiments. Last, a section titled "Example System" describes an example system and components that can be utilized to implement one or more embodiments.

Operating Environment

Figure 1:
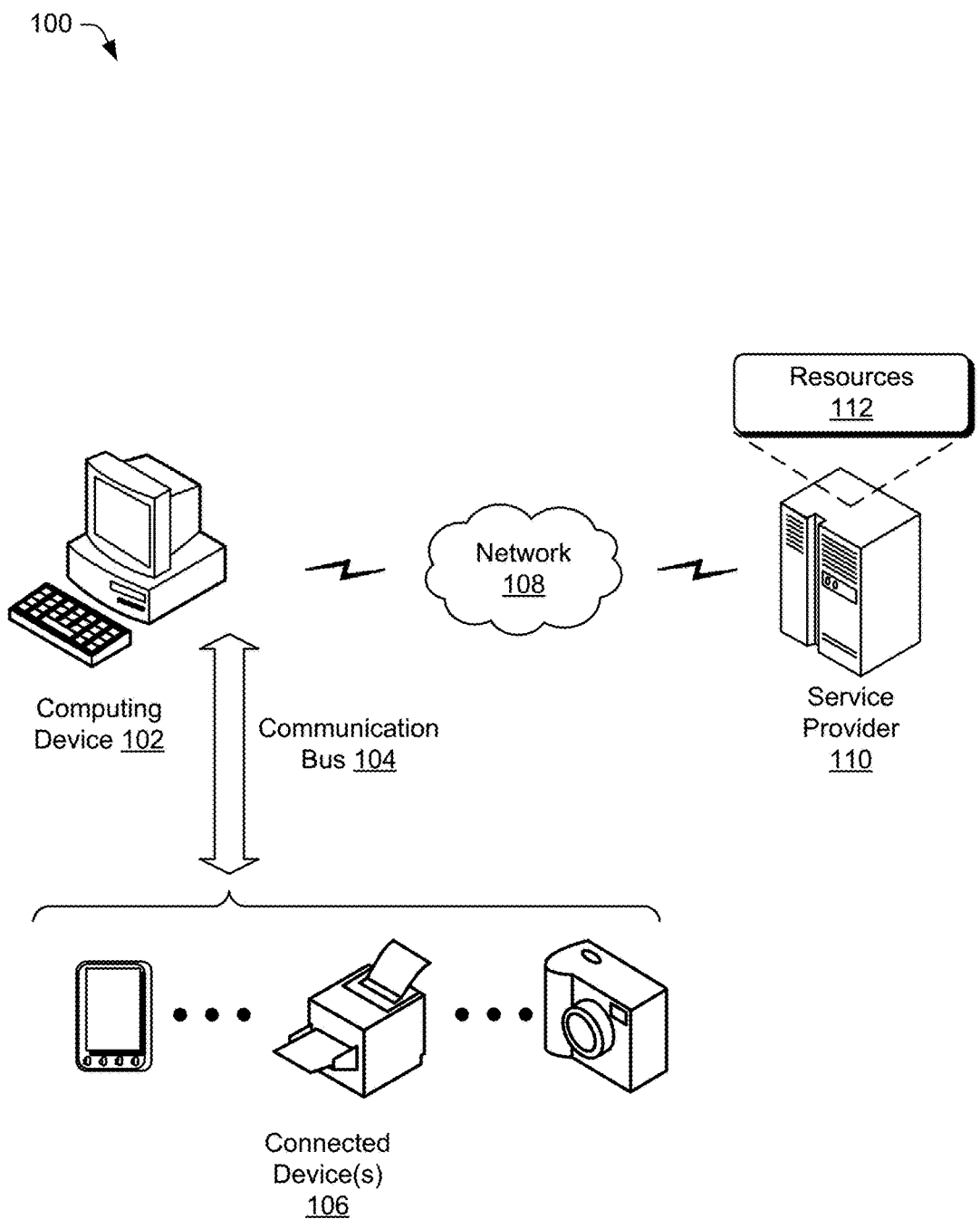
FIG. 1 is an illustration of an environment in an example implementation in accordance with one or more embodiments.

FIG. 1 illustrates an operating environment in accordance with one or more embodiments, generally at 100. The environment 100 includes a computing device 102 that is connected by a communication bus 104 to one or more connected devices 106. Examples of connected devices 106 include printers, cameras, and multi-media devices as illustrated, as well other types of devices typically connected to a computing device 102 over a communication bus 104. The connected devices 106 generally represent devices connected to the computing device 102 by the communication bus 104 using any suitable send/receive protocols, connections, and/or technologies. Accordingly, the communication bus 104 is representative of busses, connections, and devices that make use of various send/receive protocols to connect and communicate with peripheral devices from IHVs, which by way of example and not limitation may include a universal serial bus (USB), a transmission control protocol (TCP) bus, direct serial connections, and/or wireless technologies such as Bluetooth®. Typically, the communication bus 104 supports standard protocols for reads and writes between devices. Functionality of the communication bus 104 outside of the standard read/write protocols may be limited. Techniques for platform neutral device protocols described above and below, though, may be employed to customize and extend the standard protocols supported by a communication bus 104 in various ways.

The computing device 102 can be embodied as any suitable computing device such as, by way of example and not limitation, a desktop computer, a portable computer, a tablet computer, a handheld computer such as a personal digital assistant (PDA), cell phone, and the like. One example of a computing system that may represent various systems and/or devices including the computing device 102 is shown and described below in FIG. 6.

The computing device 102 can also be connected over a network 108 to a service provider 110 to access and interact with various resources 112. The resources 112 can include any suitable combination of services and/or content typically made available over a network by one or more providers. Some examples of services include, but are not limited to, a search service, a messaging service to send/receive messages, a network printing service, a software update service through which updates to drivers, script and other software may be acquired, and a social networking service. Content may include various combinations of text, video, ads, audio, multi-media streams, animations, images, webpages, web applications, device applications, and the like.

Figure 2:
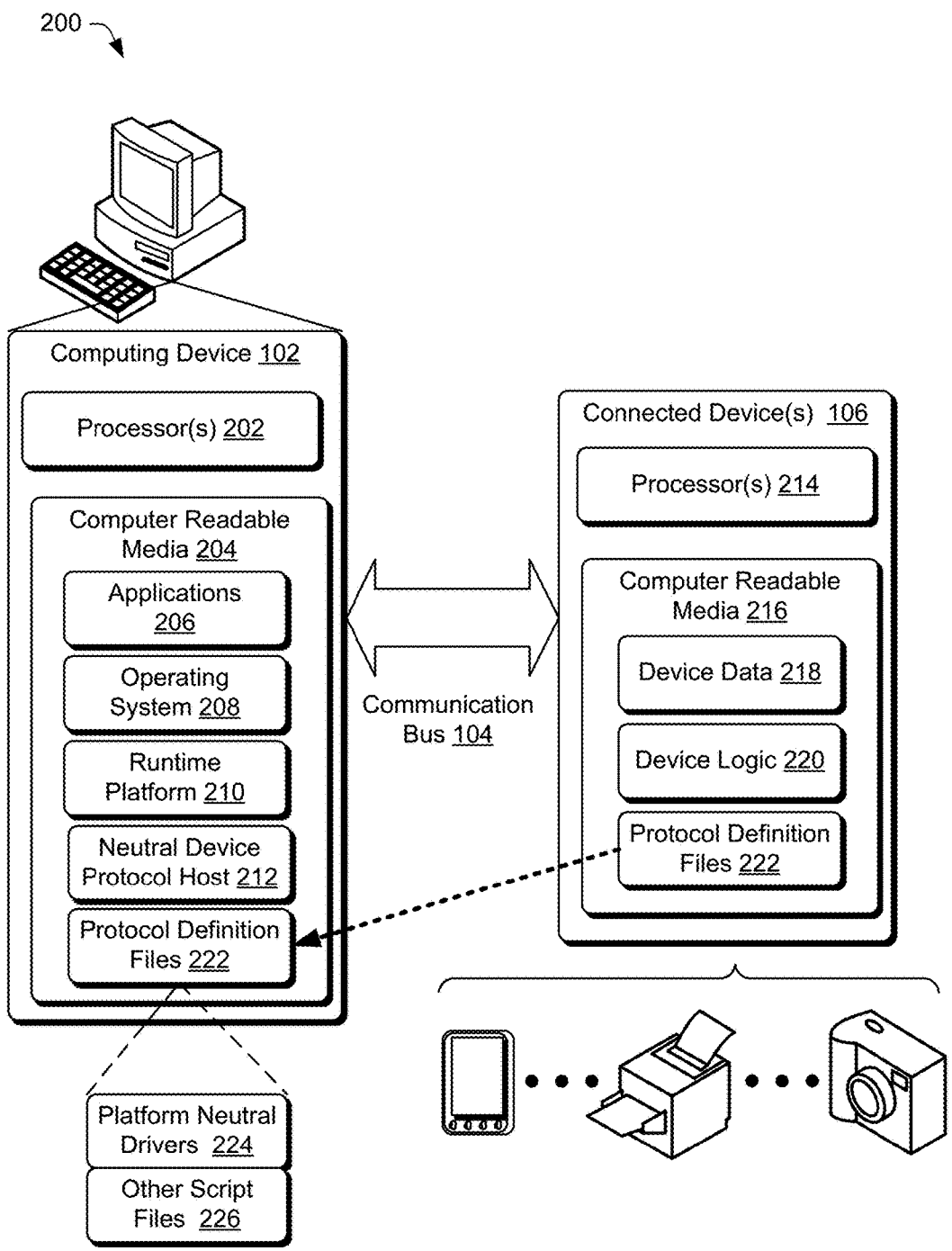
FIG. 2 is an illustration of a system in an example implementation showing aspects of FIG. 1 in greater detail.

To further illustrate the example operating environment, consider now FIG. 2 which depicts aspects of the example computing device 102 and an example connected device 106 of FIG. 1 in greater detail. The computing device 102 of FIG. 2 includes one or more processors 202, one or more computer-readable media 204, and one or more applications 206, an operating system 208, a runtime platform 210, and a neutral device protocol host 212 that reside on the computer-readable media and which are executable by the processor(s).

The runtime platform 210 supports applications that may be written using dynamic scripting and instructional languages that may be dynamically compiled at runtime, such as JavaScript, Common Intermediate Language (CIL), hypertext markup language revision 5 and/or cascading style sheets (HTML5/CSS), and extensible application mark-up language (XAML). As used herein, script is intended to refer to both traditional scripts and intermediate languages such as CIL. Script-based files and applications may operate through corresponding run-time platforms supported by the operating system 208 that are configured to provide respective execution environments for corresponding applications. The run-time platform 210 may provide a common set of features, routines, and functions for compatible applications thereby offloading coding of common tasks from application development. Thus, the runtime platform 210 can facilitate portability of applications to different kinds of systems and architectures with little or no change to the dynamic script for the applications and/or without recompiling. Examples of runtime platforms include JAVA™ runtime environment (JRE), Adobe™ Flash™, Microsoft™ NET framework, Microsoft Silverlight™, and WinRT™, to name a few examples. The runtime platform 210 may be provided as a standalone component, as a component of the operating system 208, or otherwise.

The neutral device protocol host 212 represents functionality to host script-based drivers, protocol definition files, and other executable script files to implement platform neutral device protocols in accordance with techniques described above and below. The neutral device protocol host 212 may be configured to host script in an execution environment for a corresponding runtime platform. In particular, the neutral device protocol host 212 creates a runtime process used to interpret and run hosted script and loads the executable script into the process.

As further illustrated in FIG. 2, the connected device 106 is depicted as having one or more processors 214 and one or more computer-readable media 216. In addition, the connected device 106 includes device data 218 and device logic 220 that resides on the computer-readable media. Further, in at least some embodiments the connected device 106 includes protocol definition files 222 that represent executable script that may be supplied to the computing device to implement platform neutral device protocols. For example, computing device 102 is also depicted as having protocol definition files 222 that may be acquired from the connected device or through other distribution mechanisms, such as an update service. Protocol definition files 222 may correspond to a particular runtime platform 210 and may be hosted via a neutral device protocol host 212. As illustrated in FIG. 2, the protocol definition files 222 may include platform neutral drivers 224 and/or other executable script files 226 used to define custom device protocols.

The device data 218 represents various configuration data and status data for the device, which can be provided over the communication bus 104 to the computing device in some interaction scenarios using techniques described herein. Configuration data describes various functional capabilities of the device. By way of example, for a printer device this may include types of paper trays, printing functions, memory/processing capacity, and so forth. The status data represents device specific status information. In the case of a printer device this may include ink levels, print job status, paper tray status, printing error information, connection data, and so forth. In at least some embodiments, device data 218 may be accessed, manipulated, and modified in various ways using custom protocols defined via protocol definition files 222.

The device logic 220 represents custom logic of the device used to operate and control the device. The device logic 220 may be proprietary device specific code that the operating system 208 may be unable to understand directly. Accordingly, some kind of device driver software may typically be employed to facilitate communications between the computing device 102 and connected device 106 over the communication bus 104. As mentioned, the device driver is typically compiled binary code that is platform specific. Protocol definition files 222, however, enable creation of platform neutral definition files that are script based and may replace at least some functions otherwise handled using traditional compiled drivers.

Computer-readable media as used herein can include, by way of example and not limitation, all forms of volatile and non-volatile memory and/or storage media that are typically associated with a computing device. Such media can include read only memory (ROM), random access memory (RAM), flash memory, hard disk, removable media and the like. One such configuration of a computer-readable media is signal bearing "communication media" that is configured to transmit computer-readable instructions (e.g., as a carrier wave) to the hardware of the computing device, such as via a network. The computer-readable media may also be configured as "computer-readable storage media" that excludes signals per se. Thus, computer-readable media includes both "computer-readable storage media" and "communication media" further examples of which can be found in the discussion of the example computing system of FIG. 6.

In operation, as will be described in detail below, the operating system 208 through the runtime platform 210 and neutral device protocol host 212 implements infrastructure that IHVs and OEMs may take advantage of to enable custom device protocols for interaction with the connected devices 106 using platform neutral script. To do so, the operating system 208 may expose functionality to manipulate the communication bus 104 as script-based objects. Script-based protocol definition files 222 corresponding to devices that define custom protocols using the exposed functionality may be hosted by the neutral device protocol host 212. In this manner, IHVs and OEMs may develop platform independent protocol definitions that may be employed to implement custom protocols across heterogeneous platforms and architectures.

Having described an example operating environment, consider now a discussion of example platform neutral device protocol techniques in accordance with one or more embodiments.

Example Platform Neutral Device Protocol Techniques

This section discusses details regarding example platform neutral device protocol techniques that may implemented by way of a suitably configured device, such as the example computing devices of FIGS. 1 and 2. The discussion that follows includes description of some example procedures that may be implemented using the previously described systems and devices. The procedures are shown as sets of blocks that are not necessarily limited to the particular order shown. The procedures can be performed in connection with any suitable hardware, software, firmware, or combination thereof. In at least some embodiments, the procedures can be performed by a suitably-configured computing device, such as the ones described above.

Figure 3:
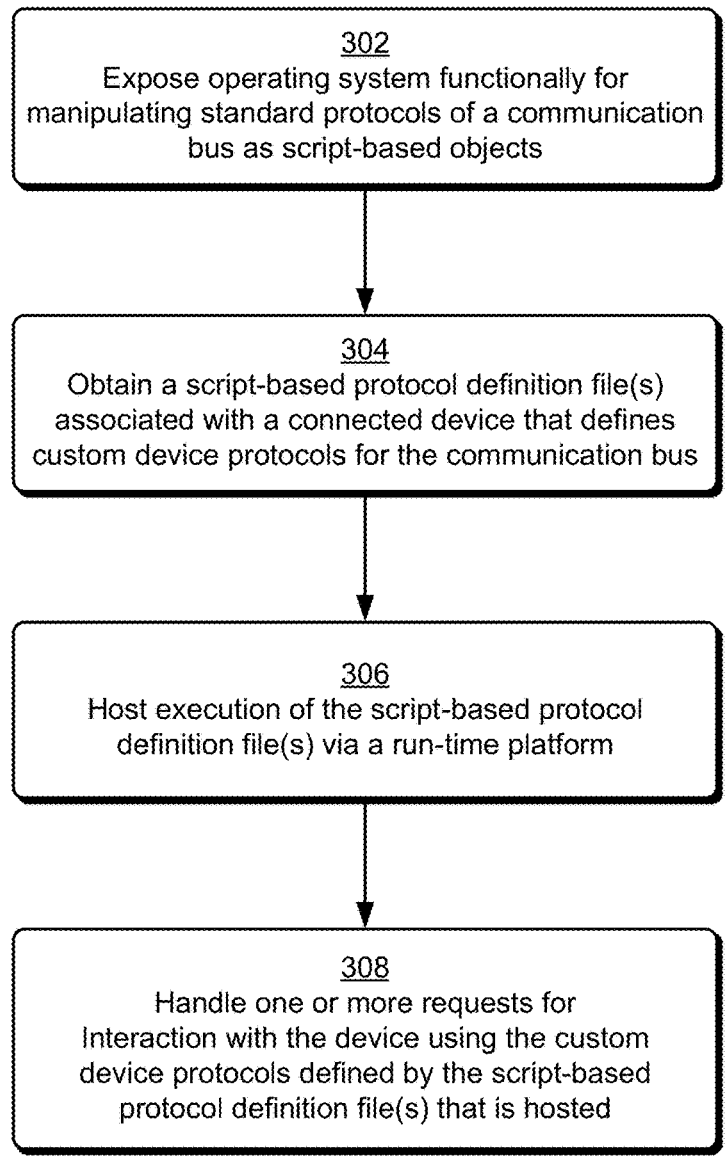
FIG. 3 is a flow diagram that describes an example procedure to host script-based protocol definition files in accordance with one or more embodiments.

FIG. 3 is a flow diagram that describes an example procedure 300 in which, script-based protocol definition files are employed to implement platform neutral device protocols of a communication bus. Operating system functionality to manipulate standard protocols of a communication bus is exposed as script-based objects (block 302). A variety of script objects may be provided to enable developers to plug-in to operating system functionality for customization of device protocols. In general, the objects provide an interface/mechanism by which developers may use script files, such as JavaScript drivers and/or definition files, to define custom protocols. The objects are configured to enable access to raw data streams and stream properties for data streams communicated via the communication bus. For example, in a printing scenario, one or more objects to enable custom handling of data streams for a print job over a USB bus may be exposed via a runtime platform or otherwise. Likewise, for media devices, objects to enable access to and control of audio/video data streams conveyed via a media interface bus may be exposed. Naturally, different respective objects may be associated with and available for multiple different communication busses/techniques employed by a computing device.

A script-based protocol definition file associated with a connected device is obtained that defines custom device protocols for the communication bus (block 304) and execution of the script-based protocol definition file is hosted via the run-time platform (block 306). The script-based protocol definition file is configured to utilize OS functionality to customize device interaction scenarios. In particular, a script based protocol definition file includes executable script that may be configured to implement a custom protocol by manipulating script-based objects that are exposed, interpreting and handing objects and commands that are passed into the script, incorporating or otherwise providing entry points into script that may be discovered by the OS in some manner and employed to invoke the custom protocols, processing stream data, transforming/translating data chunks in and out of device-specific formats, and so forth. For at least some connected devices, the script-based protocol definition files may act as platform neutral drivers for the connected devices. In addition or alternatively, the script-based protocol definition files may be configured to work in combination with existing drivers to implement platform neutral extensions and customizations of the existing driver functionality.

Script represented by the script-based protocol definition files 222 may be configured to manipulate objects to define and modify behaviors, set object states, get and set variables, start and stop streams, control stream properties, and so forth. Such manipulations enable a variety of customizations of standard protocols for a corresponding communication bus. Thus, for example, a relatively simple read/write bus designed to handle data operations in a simple bulk-in/bulk-out manner may be modified to implement more advanced device interactions. Since these modifications occur using dynamically compiled scripting languages to control/configure/handle script-based objects, the script-based drivers/definition files used to implement the modifications are platform neutral and may be ported to different systems with little or no change to the script.

Script-based protocol definition files for a connected device may be acquired in various ways. For example, a protocol definition file obtained in connection with a prior interaction with a particular device may be available in and accessed from local storage of the host computing device. Additionally, during a first-time interaction with the particular device and/or when local storage does not already contain the protocol definition file, the protocol definition file may be acquired directly from storage on the particular device. In this case, the particular device may include flash memory or other suitable storage/memory used to store a corresponding script-based definition file/driver. The particular device may therefore supply a protocol definition file to a host computing device from storage over a communication bus using standard protocols. In another approach, an update service may make protocol definition files for one or more connected devices available for download over a network. Accordingly, a computing device 102 (e.g., host) may obtain a protocol definition file from the service either through direct interaction with the service or through the corresponding connected device. Additional details regarding mechanisms to acquire and use protocol definition files are described in relation to the following figures.

One or more requests for interaction with the device are handled using the custom device protocols defined by the script-based protocol definition file that is hosted (block 308). For instance, the neutral device protocol host 212 is configured to host a protocol definition file 222 for a connected device in the context of a corresponding runtime platform 210. Thus, for example, JavaScript definition files/drivers may be hosted via a JavaScript runtime environment. Further, the neutral device protocol host 212 may invoke the protocol definition file 222 to handle requests for device interaction in various scenarios. This may occur by making calls to entry points into script that are specified by the protocol definition file 222 and may be advertised/identified though notification messages or otherwise exposed for discovery by the OS/host. Some example request/response scenarios are described in relation to FIG. 5 below.

Figure 4:
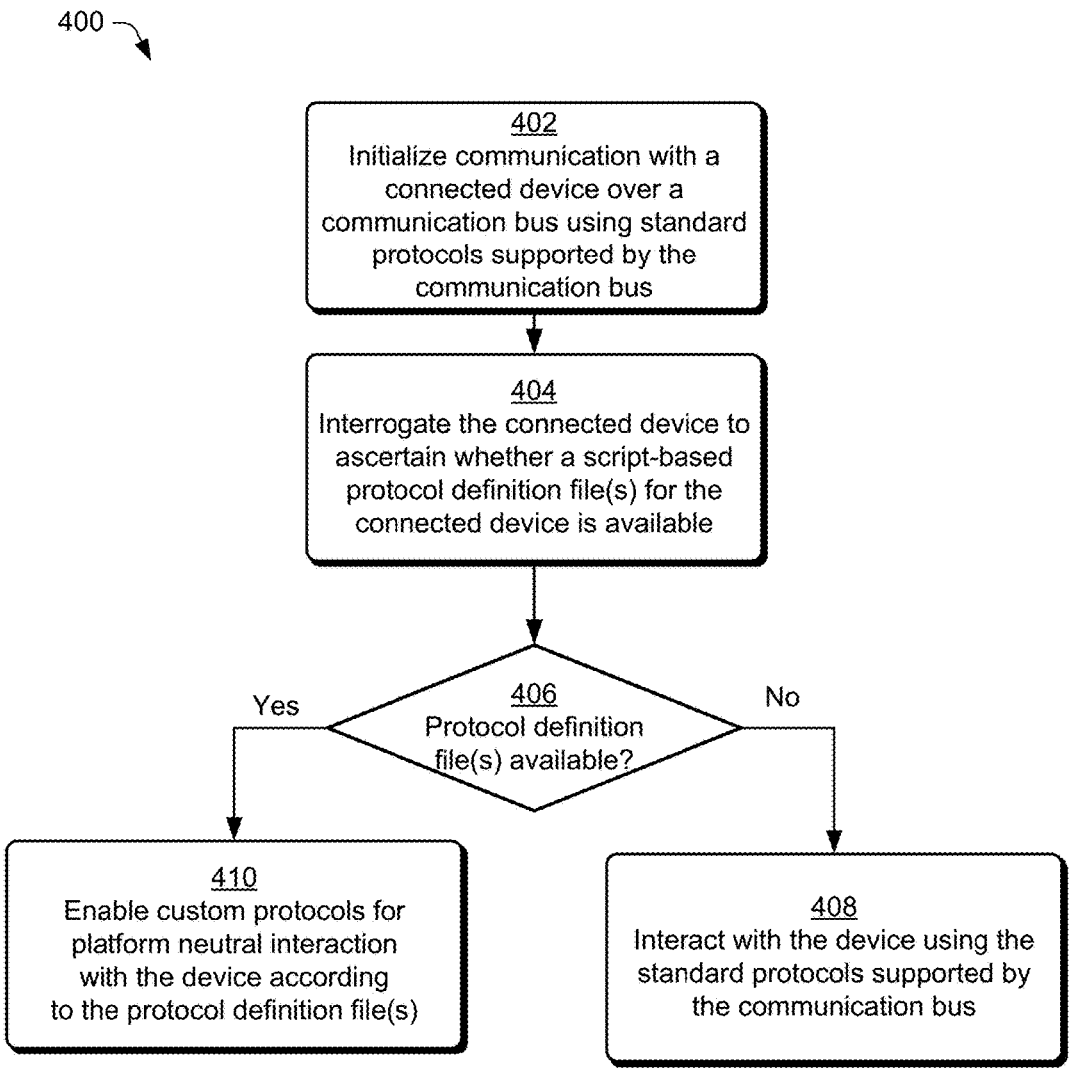
FIG. 4 is a flow diagram that describes an example procedure to acquire and use script-based protocol definition files in accordance with one or more embodiments.

FIG. 4 is a flow diagram that describes an example procedure 400 to acquire and use script-based protocol definition files in accordance with one or more embodiments. The protocol definition files enable communication with corresponding devices using platform neutral script/drivers. This includes the ability to retrieve platform neutral script/driver for a connected device from the device over a communication bus using standard protocols. Subsequently, the platform neutral script/driver may be executed to handle interaction with the device using extended/customized protocols defined via the platform neutral script/driver. As noted, the same platform neutral script/driver may be employed with heterogeneous systems, architectures, and computing platforms. This enables comprehensive support for connected devices without having to develop many different platform specific drivers or create new drivers as new or modified systems, architectures, and computing platforms become available.

Communication is initialized with a connected device over a communication bus using standard protocols supported by the communication bus (block 402). For example, the operating system 208 of a host computing systems may initially communicate with a device according to default or standard protocols when the device is connected. This sets-up a communication channel with the device over an appropriate communication bus 104 and may enable the host to assess whether custom protocols are defined for the device.

The connected device is interrogated to ascertain whether a script-based protocol definition file for the connected device is available (block 404) and a determination regarding whether the script-based protocol definition file is available is made based on the interrogation (block 406). Here, the operating system 208 uses standard protocols to interrogate a connected device 106 and determine if a script-based protocol definition file corresponding to the device are available. In at least some embodiments, the interrogation comprises a request message to discover the protocol definition file and/or a location at which the protocol definition file is available. In some cases, the protocol definition file is maintained in storage associated with the connected device. Alternatively, a protocol definition file may be available from a web service as described previously. The connected device 106 may respond to this request with an indication regarding whether or not the device has the protocol file and/or implements custom device protocols. The connected device 106 may also supply the protocol definition file if available and/or information sufficient to enable the operating system to locate and download a protocol definition file into local storage at the host.

When the script-based protocol definition file is not available, standard protocols supported by the communication bus are used to interact with the connected device (block 408). Here, interaction may be limited to basic or default scenarios supported by the standard protocols. When the script-based protocol definition file is available, custom protocols for platform neutral interaction with the connected device are enabled according to the script-based protocol definition file (block 410). For example, the available protocol definition file is acquired and placed into local storage (if not already contained in local storage). The neutral device protocol host operates to host the protocol definition file and implement the custom protocols defined therein. As variety of extended and/or customize device interaction scenarios may be enabled in this manner, some examples of which are discussed just below in relation to the description of FIG. 5.

Figure 5:
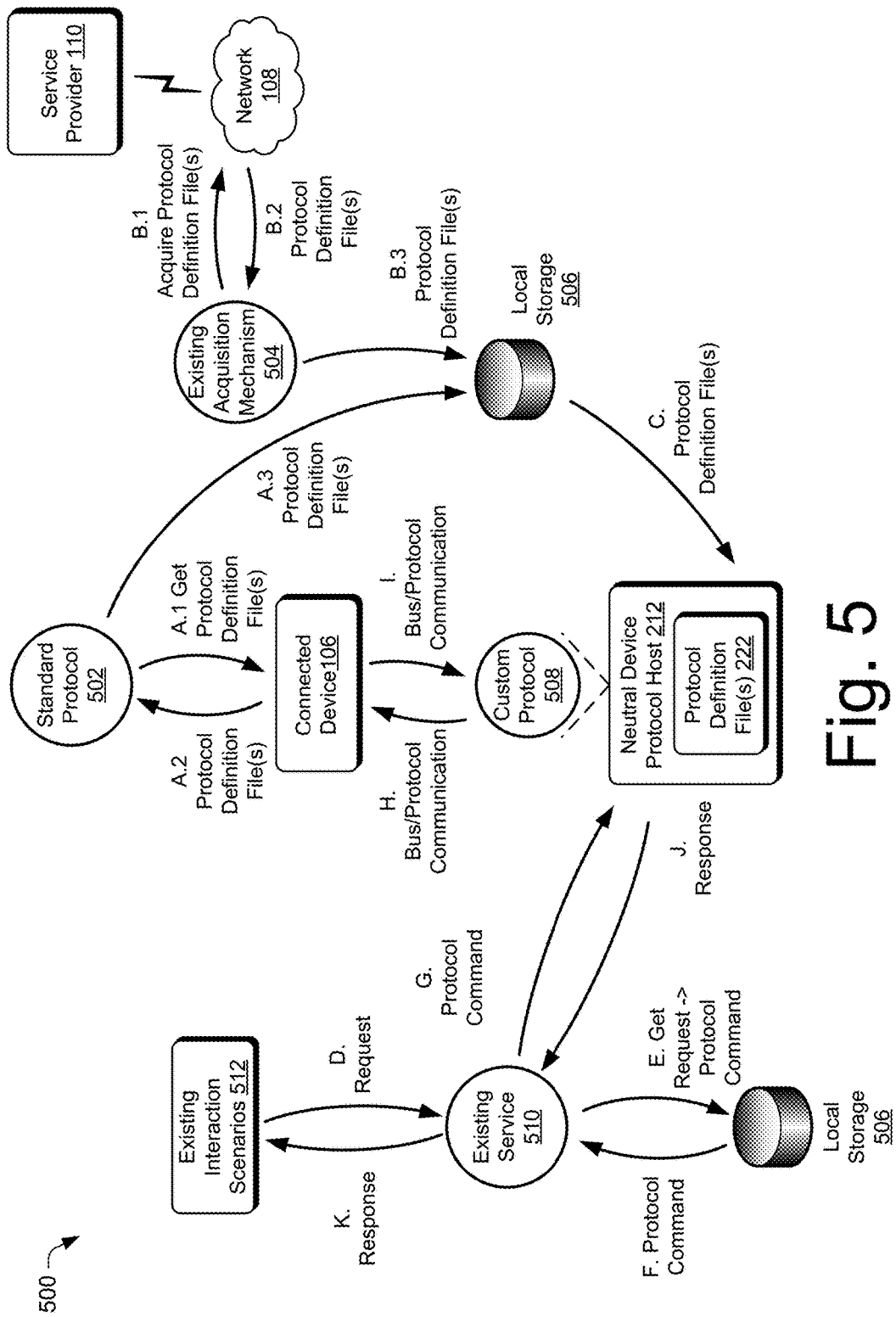
FIG. 5 is a block diagram that represents device interaction scenarios that employ custom device protocols defined through script-based protocol definition files in accordance with one or more embodiments.

FIG. 5 is a block diagram that represents, generally at 500, device interaction scenarios that employ custom device protocols defined through script-based protocol definition files in accordance with one or more embodiments. In FIG. 5, example acts to acquire and use protocol definition files are labeled using different letters "A" to "K"

Broadly speaking, FIG. 5 illustrates that standard protocols 502 and/or existing acquisition mechanisms 504 may be employed to locate, access, and download one or more protocol definition files 222 for a connected device 106. The protocol definition files 222 may be stored in local storage 506 of a host computing device. A neutral device protocol host 212 may host the protocol definition file within a runtime platform 210 supplied by the host computing device. The protocol definition files 222, when executed via the host, implement a custom protocol 508 that may be used to invoke existing services 510 and/or extend/customize existing device scenarios 512.

More particularly, the host computing device may first locate and/or acquire script-based protocol definition files for the connected device 106. To do so, the operating system 208 of the host may make use of an existing device service or a generic driver (e.g., a class driver corresponding to a device class/type for the connected device) configured to handle obtaining the platform neutral script/driver from the device itself using a standard protocol or from a web service.

For example, to obtain a protocol definition file using standard protocols, the operating system 208 may send a get definition file request to the device (Act A1). This process occurs using a standard protocol 502 supported by a communication bus 104 over which communication with the connected device 106 takes place. If the protocol definition file is available, the connected device 106 may return the protocol definition file to the OS (Act A2), which may cause storage of the protocol definition file in local storage 506 (Act A3).

Similarly, to acquire the protocol definition file 222 from a web service, an existing acquisition mechanism 504 may be employed to send a request to the web service, which is depicted as being provided by a service provider 110 over a network 108 (Act B1). In response, the service provider 110 returns the appropriate protocol definition file 222 (Act B2) and the operating system 208 again stores the protocol definition file in local storage 506 (Act B3). The protocol definition file may also be acquired and stored on local storage 506 from media such as an optical disk, a flash drive, and so forth.

Now the system is prepared to host the acquired protocol definition file to implement a platform neutral device protocol for the connected device 222. Specifically, the neutral device protocol host 212 may retrieve the protocol definition file 222 from local storage 506 (Act C) and execute the associated script to implement the custom protocol 508.

In one particular approach to acquisition, the operating system 208 is configured to implement a sequence to locate and acquire the protocol definition files/platform neutral drivers from multiple different sources. In this approach, the operating system 208 may first attempt to locate a protocol definition file/driver locally on the host computing device using a local acquisition mechanism. This may involve searching local storage of the host for the protocol definition file using a device model identifier that may be acquired from the device using standard protocols of the communication bus. In addition or alternatively, the local acquisition mechanism may search using a device class identifier provided by the device using standard protocols of the communication bus. Searches using the device model identifier and device class identifiers may be performed individually or sequentially as part of the overall location/acquisition sequence. A file/driver may be stored in an appropriate location on the host such as in the local storage 506, a driver store/database, on removable media, and so forth. Act C generally represents local acquisition of the protocol definition file driver from any suitable local storage associated with the host.

If a protocol definition file/driver is unavailable from the local acquisition mechanism, the operating system 208 may then attempt to obtain the protocol definition file/driver over the communication bus 104 from the connected device 106 using standard protocols. Acquisition from the connected device 106 is illustrated by acts A1-A3 described above. If a suitable protocol definition file is located, the protocol definition file may be downloaded to local storage of the host and may be acquired therefrom for the current interaction and/or subsequent interaction with the connected device 106. It should be noted, that the operating system 208 may verify signatures/certificates associated with acquired protocol definition files or otherwise validate the files to ensure the executable code and corresponding device are trusted. This validation step may prevent untrusted devices from supplying unproven or malicious code to the operating system 208.

If the operating system 208 is unable to locate a protocol definition file through the foregoing mechanisms (e.g., either locally or directly from the device), the operating system 208 may then proceed with the network acquisition mechanism that is represented by acts B1-B3 described above. If a suitable protocol definition file is located via the network, the protocol definition file may be downloaded to the host and may be used for the current interaction with the connected device. The downloaded protocol definition file may also be stored locally (in local storage 506, a database, or otherwise) for use during subsequent interactions and/or for quick access if the device is disconnected and then reconnected. A validation of the protocol definition files may also occur as part of the network acquisition mechanism to ensure that the service provider 110 is trusted and to prevent untrusted code from being downloaded from the network 108.

Naturally, the foregoing sequence is described as but one representative example approach to acquiring platform neutral protocol files/drivers. In general, one or more sources and corresponding acquisition mechanisms (e.g., local acquisition, connected device acquisition, network acquisition, etc.) may be employed on an individual basis and/or in different sequences/combinations to implement the acquisition of protocol definition files/drivers in various ways.

Now, when a request is made for interaction with the device or operations are otherwise initiated for an existing interaction scenario (Act D), the existing service 510 may perform a look-up to ascertain whether a corresponding protocol command exists (Act E) and retrieve the command if available (Act F). The command may then be issued for handling by the protocol definition file 222 via the neutral device protocol host. This may occur by passing the command to an appropriate entry point into script along with one or more script-based objects that may be manipulated. The commands may be described by standard actions of a device driver, a device protocol, or the script that implements the custom protocol. The protocol definition file 222 is configured to interpret and execute the command(s). This may involve one or more bidirectional request/response cycles with the connected device 106 (Acts H-I) using customized protocols defined for the interaction and supported by the device. The protocol definition file 222 may generate a response to the request (Act J) based on the bidirectional communication with the device and send the response to the existing service 510. The existing service 510 may then form a response (Act K) to the original request of Act D in an appropriate format for the existing device scenario 512. In this manner, the protocol definition file 222 is able to inject customized handling, manipulations, and protocols into existing device scenarios 512. The techniques may also enable development of new custom scenarios and device interactions. A few illustrative examples are now discussed.

In accordance with the foregoing description, standard protocols of a communication bus 104 may be manipulated in a variety of different ways using script-based protocol definition files that are platform neutral. For instance, custom protocols for bidirectional communications may be established between a connected device 106 and a host (e.g., computing device 102). By way of these bidirectional communications, applications 206 of the host may be able to control connected devices and obtain rich device data 218 from the devices, including configuration and status data. The applications may also be able to manage device settings for connected devices, create profiles for different device modes, handle data processing operations for data streams exchanged between the host and connected devices, and so forth. The protocol definition files further provide platform independent mechanisms for a host/application to interpret input commands for connected devices, and make decisions about output data in data streams. This may include transforming data in various ways and/or creating entirely new data for output.

Further, platform neutral protocols may be employed to customize data handling in various ways. This may include selecting and adjusting data stream rates, changing the size of data chunks for processing operations and transformations of data, implementing routines to handle very large amounts of data, and so forth. Additionally, custom device protocols enable selective control over data streams to perform actions such as starting and stopping the stream, inserting control data in the stream (e.g., wrapping the stream with control data), selecting which portions of a stream are provided for processing, and so forth. In some cases, the control provided over data streams facilitates a model to persist data across sequential invocations of a platform neutral data format such that large scale input parsing and output generation can be performed. Here, the client application may specify exactly what data the system should supply for each sequential invocation, which may facilitate large scale transforms and iterative processing.

Custom device interaction scenarios may be employed for a variety of kinds of devices. In a printing context, for example, the techniques may be employed to create platform neutral drivers that may be ported to different systems. The platform neutral drivers may facilitate collection of rich printer status and configuration information and handling of print jobs. For example, information on ink levels, print job status, device capabilities, and so forth may be obtained. Custom scenarios may also be established for such things as manual duplexing, photo printing options, ink control, and so forth.

For a digital camera, default functionality for plug-and-play interaction with the camera to download photos may be modified to create custom menus and options, launch an advanced photo management application, pre-process photos using an editor, and so forth. In another example, custom device protocols may be implemented to access and control device settings for the camera. For example, a user may be able to access and set-up different picture mode profiles using their desktop computer rather than relying on the small form input controls of the camera itself. In another example, a user may be able to access and utilize an image processor on the camera to manipulate raw images and transfer images produced from the manipulations to the computing device.

Interaction with media devices, such as mp3 players and/or video devices may also be customized. For instance, platform neutral protocols may be used to control streaming of media to and from a device including controlling of buffering, adjusting quality, and so forth. The described techniques may also enable custom interactions to obtain and apply codecs appropriate to media stored on a device, wrap a/v streams with control data, control playback, handle transfer of media back and forth between a host and media device, and so forth. A variety of other interaction scenarios with different types of connected devices are also contemplated.

Having described some example details regarding platform neutral device protocol techniques, consider now a discussion of an example system to implement the described techniques in accordance with one or more embodiments.

Example System

Figure 6:
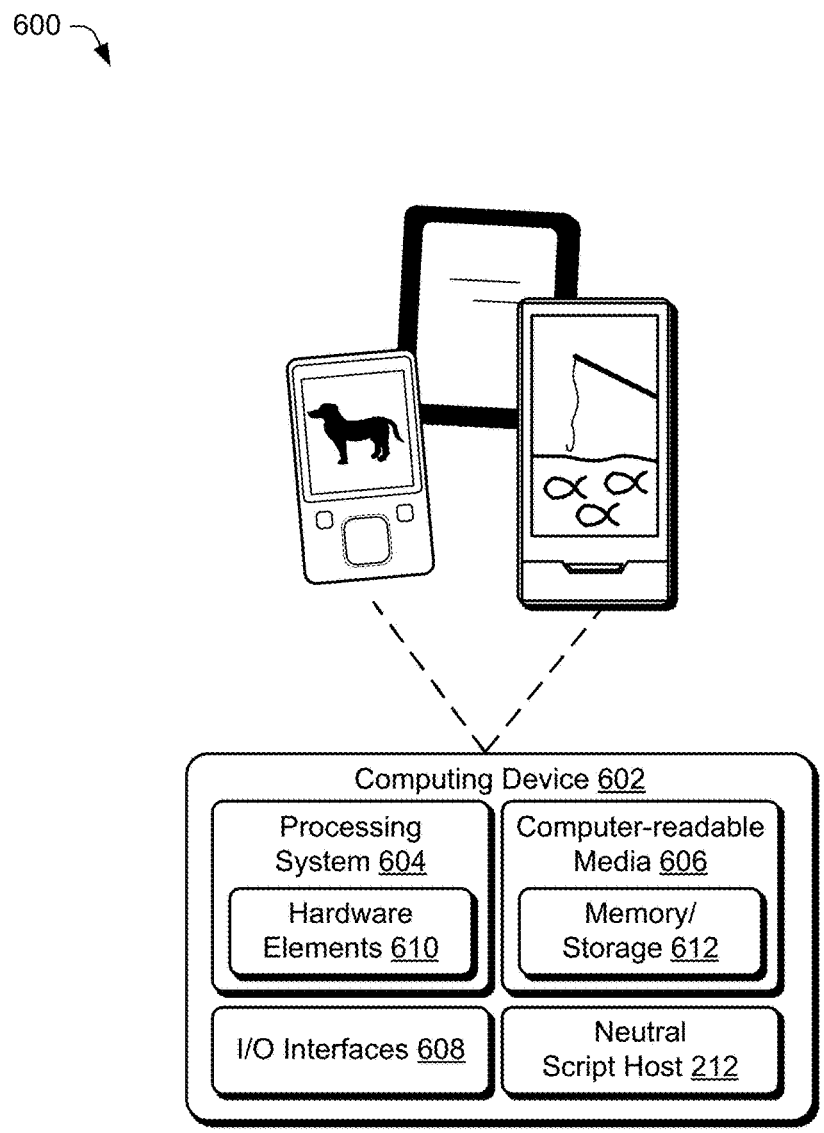
FIG. 6 illustrates an example computing system that can be utilized to implement various embodiments described herein.

FIG. 6 illustrates an example system generally at 600 that includes an example computing device 602 that is representative of one or more computing systems and/or devices that may implement the various techniques described herein. The computing device 602 may be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a host, a client device, a server of a service provider, and the like.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone for voice input, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways to support user interaction Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, microcontroller devices, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules including the neutral device protocol host 212 may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

CONCLUSION

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A method implemented by a computing device comprising:
    exposing functionality for manipulating a bus as one or more objects to enable customized interaction with a connected device through a dynamically compiled protocol definition file corresponding to the connected device that defines a custom device protocol for the bus;
    hosting execution of the dynamically compiled protocol definition file via a runtime platform of the computing device; and
    handling one or more requests for interaction with the connected device using the custom device protocol defined by the dynamically compiled protocol definition file that is hosted.

2. The method of claim 1, wherein the protocol definition file comprises a platform neutral driver for the connected device.

3. The method of claim 1, wherein the protocol definition file is configured to work in combination with existing drivers to implement platform neutral extensions and customizations of existing device driver functionality.

4. The method of claim 1, wherein the protocol definition file is based on a traditional script.

5. The method of claim 1, wherein the protocol definition file is based on an intermediate language.

6. The method of claim 1, wherein the connected device comprises a printer and the protocol definition file comprises a platform neutral printer driver to define a custom protocol for handling print jobs via the bus.

7. The method of claim 1, further comprising:
    discovering, from the connected device through standard protocols supported by the bus, a storage location where the protocol definition file is available; and
    acquiring the protocol definition file from the storage location.

8. The method of claim 1, wherein the bus comprises a universal serial bus (USB).

9. The method of claim 1, wherein the protocol definition file is configured to specify entry points configured to implement the custom device protocol.

10. The method of claim 1, wherein the custom device protocol for the bus defines modifications to insert control data into a data stream communicated between the computing device and the connected device via the bus.

11. The method of claim 1, wherein the custom device protocol defines bidirectional communication between the computing device and the connected device to obtain device data describing device status and configuration from the connected device.

12. The method of claim 1, wherein the exposing comprises exposing operating system functionality for manipulating the bus.

13. A method implemented by a computing device comprising:
    initiating communication with a connected device over a bus using standard protocols supported by the bus;
    ascertaining whether a protocol definition file configured to implement a custom device protocol for interaction with the connected device via the bus is available from the connected device;
    when the protocol definition file is available;
    acquiring the protocol definition file from the connected device using the standard protocols; and configuring the computing device to enable the custom device protocol according to the protocol definition file to handle requests for interaction with the connected device.

14. The method of claim 13, further comprising when the protocol definition file is not available, handling requests for interaction with the connected device using standard protocols supported by the bus.

15. The method of claim 13, wherein the ascertaining comprises interrogating the device via the standard protocols to discover the protocol definition file in storage on the connected device.

16. The method of claim 13, wherein the protocol definition file is configured to manipulate objects exposed by an operating system of the computing device to enable access to raw data and stream properties for data streams communicated via the bus.

17. The method of claim 13, wherein configuring the computing device to enable the custom device protocol comprises storing the protocol definition file in local storage of the computing device and hosting execution of the protocol definition file via a platform neutral device protocol host corresponding to a runtime platform of the computing device.

18. The method of claim 17, wherein the protocol definition file comprises a platform neutral driver for the connected device.

19. The method of claim 13, wherein the protocol definition file is configured to work in combination with existing drivers to implement platform neutral extensions and customizations of existing device driver functionality.

20. One or more computer-readable storage media comprising instructions stored thereon that, responsive to execution by one or more processors at a computing device, perform operations comprising:
    exposing functionality for manipulating a bus as one or more objects to enable customized interaction with a connected device through a dynamically compiled protocol definition file corresponding to the connected device that defines a custom device protocol for the bus;
    hosting execution of the dynamically compiled protocol definition file via a runtime platform of the computing device; and
    handling one or more requests for interaction with the connected device using the custom device protocol defined by the dynamically compiled protocol definition file that is hosted.

* * * * *